F. B. RAE.
COMBINED VEHICLE STEERING GEAR AND CONTROLLING MECHANISM.
APPLICATION FILED JUNE 18, 1907.

1,073,439.

Patented Sept. 16, 1913.

2 SHEETS—SHEET 1.

Witnesses

Inventor
Frank B. Rae,
By his Attorneys
Edwards, Sager & Wooster

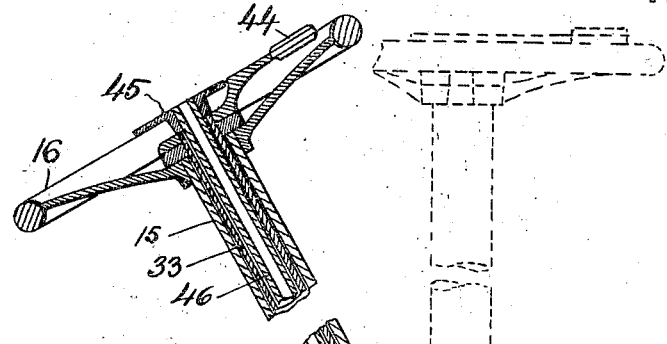
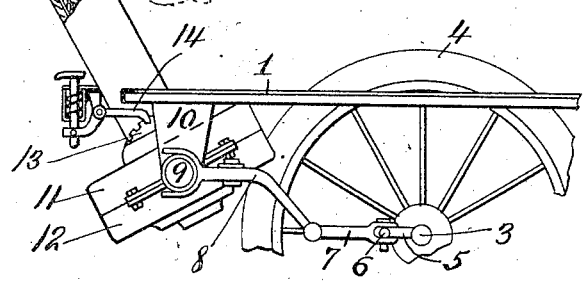

UNITED STATES PATENT OFFICE.

FRANK B. RAE, OF DETROIT, MICHIGAN, ASSIGNOR, BY MESNE ASSIGNMENTS, TO RAE ELECTRIC COMPANY, A CORPORATION OF MICHIGAN.

COMBINED VEHICLE STEERING-GEAR AND CONTROLLING MECHANISM.

1,073,439.

Specification of Letters Patent.  Patented Sept. 16, 1913.

Application filed June 18, 1907. Serial No. 379,594.

*To all whom it may concern:*

Be it known that I, FRANK B. RAE, a citizen of the United States, residing at Detroit, in the county of Wayne and State of Michigan, have invented certain new and useful Improvements in Combined Vehicle Steering-Gear and Controlling Mechanism, of which the following is a full, clear, and exact specification.

This invention relates to combined vehicle steering gear and controlling mechanism, and has particular reference to a construction wherein the entire operating mechanism of the vehicle is combined in a single structure.

An object of the invention is to provide in a steering gear, means whereby a rotary movement of a hand wheel or lever is translated into a reciprocatory movement of a shaft operating the wheels, in such manner as to secure the requisite gear reduction and prevent the transmission of strains to the hand wheel from the steering wheels, but without interfering with the actuation of the steering wheels when desired.

A further object is to prevent reversing of the wheels by positively limiting the movement in each direction of the reciprocatory shaft.

A still further object of the invention is to provide a motor controlling mechanism mounted on and inclosed by the steering gear, and to so mount the entire mechanism on the body that it can be adjusted to any desired position relatively to the vertical without throwing either the steering or motor controlling mechanisms out of operation.

The invention is shown in the accompanying drawings, wherein—

Figure 2:
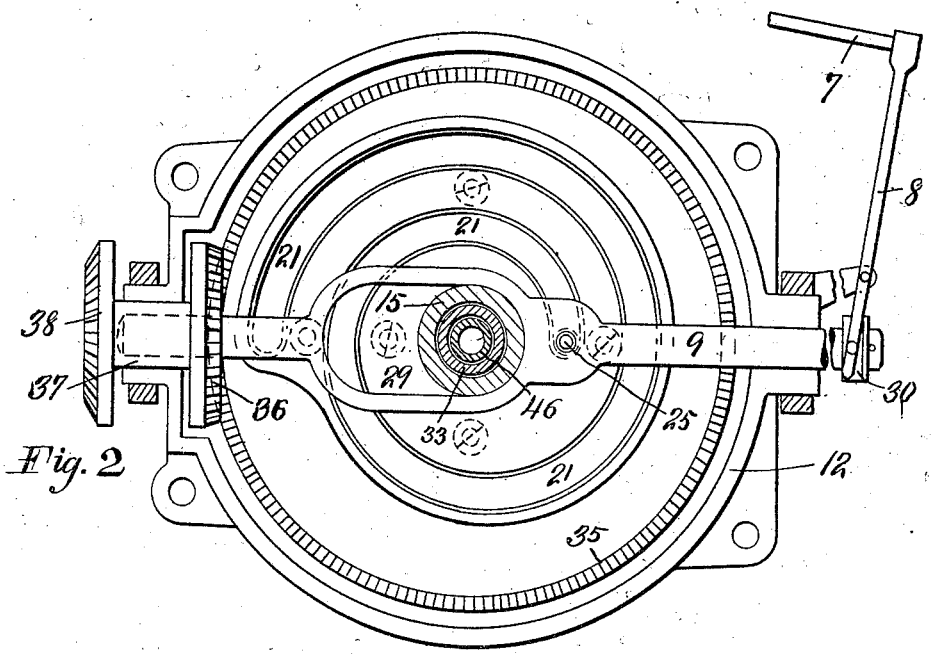
Figure 1:
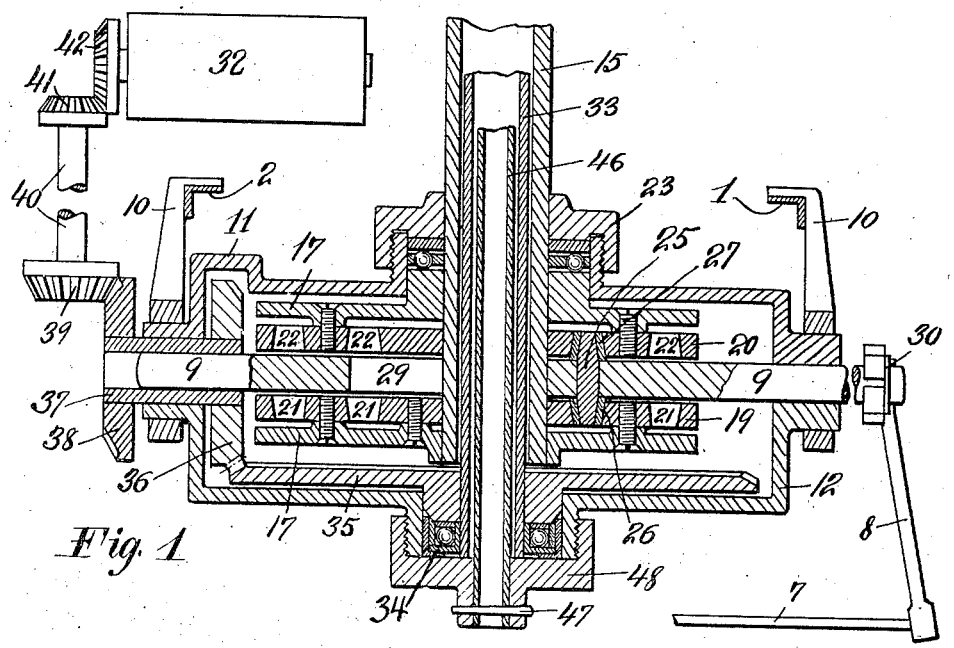

Figure 1 is a transverse section; Fig. 2 is a detail plan view, the upper half being removed; Fig. 3 is an elevation, and Fig. 4 is a plan view showing my invention and the relation to the operative parts of the vehicle.

1 represents the side frames of a vehicle, 2 an intermediate frame, 3 the front axle, 4 the wheels pivoted on bell-cranks 5, 6 a link connecting the levers 5, 7, a rod connected at one end to link 6 and at the other to an arm 8 carried by a reciprocating shaft 9. Mounted in bearings carried by hangers 10 on the frame is an oscillatory casing or box composed of upper and lower halves 11, 12, bolted together, the upper half 11 being provided with a rack segment 13, which is engaged by a foot controlled latch 14 to vary the angular position of the casing in the hangers and thereby, the position of the steering and controlling post 15, and the steering wheel 16 mounted thereon. The steering post 15 comprises a tube turning in the casing and carrying fixed thereto two separated plates 17 which carry cam plates 19, 20, each having cut therein involute cam slots 21, 22. The upper plate is preferably splined to the tubular shaft 15, so that by adjusting cap 23, wear can be taken up as will be hereinafter explained. Mounted between the plates 19, 20 is the slotted reciprocatory shaft 9 having bearings in the casing and carrying a pin 25 and anti-friction rollers 26, 27 engaging the respective slots 21, 22. It will be observed that the slots 21, 22, are tapered, and the rollers 26, 27 correspondingly tapered, thereby enabling all wear of the rollers in the slots to be taken up by adjusting the upper splined plate 17 and its cam plate 20, by means of cap 23. To reduce friction, ball bearings are preferably interposed between the cap 23 and plate 17. From Fig. 2 it will be seen that the slot 29 of shaft 9 embraces post 15. On the end of shaft 9 is a rotatable collar 30 to which arm 8 is attached, thus permitting the shaft 9 to rotate with the casing without affecting arm 8.

The construction thus far described relates to the steering mechanism, and its operation will be evident from the fact that as the involute cams are turned by wheel 16, the shaft 9 will be reciprocated in one or the other direction to turn the wheels 4 on the axle 3, Fig. 2 showing an extreme position. By reason of the involute spiral cam, any thrust transmitted to shaft 15 through pin 25 from the wheels will be transversely through the center, and hence there will be no tendency to turn the shaft itself, so that the gear will stay locked in any position and still be readily operated to change the direction of the vehicle when the cams are turned.

The mechanism for operating a controller, as a drum 32, in an electric vehicle, comprises a shaft 33 journaled within shaft 15, having a lower bearing 34 and carrying a gear 35 which meshes with a gear 36 on a hollow shaft 37. The latter is made hollow so as to form a bearing for one end of shaft 9. Meshing with gear 38 is a gear 39, which by shaft 40 and gears 41, 42 rotates the drum 32, the latter carrying circuit controlling contacts as is well known in the art. Instead of operating a drum, I may use the rotation of shaft 37 to operate other forms of engine-controlling devices. It will be observed that when the casing and steering post are rocked, no effect will be had on the controller because gear 35 will simply roll around on gear 36. In order to turn shaft 33, a lever 44, or a wheel, is provided, and in order to enable the operator to know accurately the position of the drum 32, a dial 45 is provided. The dial 45 is carried by a tube or rod 46 which is fastened to the casing 12 as by a pin 47 passing through the nut 48 which adjusts the bearing of shaft 33.

The operation of the invention will be clear from the foregoing description. When the pin 25 reaches the ends of the involute slot, no further movement in that direction can take place, and in practice this distance will be so proportioned as to provide for the shortest practicable turn of the vehicle. By reason of the involute slot, the strain from the wheels is always radial of the steering post, so that there will be no tendency to turn the latter, and also the gear will remain in any position between the extremes. A further advantage resides in the provision for taking up wear between the cam plates, which is an important advantage in mechanisms of this type.

So far as I am aware, it has not heretofore been proposed to translate a rotary into a reciprocatory motion, in vehicle steering mechanism.

By my improved arrangement of steering gear, I can mount the motor controlling devices within the steering post, thus having a single structure for steering and speed control and capable of operation by one hand. The operation of each will be entirely independent of the other, and both can be equally well operated at varying vertical positions.

It will be obvious that modifications and changes may be made in the specific construction shown, and that some parts may be used without others, without departing from the spirit or scope of the invention.

Having thus described my invention, I declare that what I claim as new and desire to secure by Letters Patent, is,—

1. In a vehicle steering gear, the combination with a steering wheel, of a reciprocating and rocking shaft connected thereto, an involute cam for operating said shaft, a rotary shaft carrying said cam and supported on said rocking reciprocating shaft whereby to permit angular adjustment of the rotary shaft, substantially as described.

2. In a vehicle, the combination with a hollow rotatable steering post, an involute cam operated by said post, a reciprocatory rock shaft reciprocated by said involute cam, and connections between said shaft and the wheels of the vehicle, of a controller, a shaft for operating said controller carried within said steering post, connections between said controller shaft and said controller, and means for adjusting the angular position of said steering post without affecting the operative relation of said reciprocatory rock shaft and said first named connections.

3. In a vehicle, the combination with a hollow steering post, and rotatable steering wheel connections mounted thereon, of a controller operating shaft rotatably mounted on said post, a controller, and gear connections between said controller and said shaft, means for angularly adjusting said steering post and parts mounted thereon, and means whereby the rotation of said steering post, the rotation of said controller shaft, and the angular adjustment of said steering post may be each effected without affecting the operative relation of the other.

4. In a vehicle, the combination with a hollow hand post, hand wheel, and means including a cam and reciprocatory shaft for connecting said hand wheel with the wheels of the vehicle, of a controller, a controller operating shaft within said post, and connections including a beveled gear between the said operating shaft and said controller, and means for mounting said cam, said reciprocatory shaft, and said beveled gear to permit said steering post to be angularly adjusted without affecting the operation of said controller or said connections with the vehicle wheel.

5. In a vehicle steering gear, the combination with a hand wheel, a cam operated by said wheel, a shaft reciprocated by said cam, of a casing for inclosing said cam and a portion of said shaft, and means including bearings for said shaft to permit said casing and said hand wheel to be adjusted in angular position.

6. In a vehicle steering gear, the combination with a steering wheel, a rotary steering post, an involute actuating cam carried thereby, and a reciprocating connection with the wheel, of means for taking up the wear of the cam, substantially as described.

7. In a vehicle steering gear, the combination with a steering wheel, and a rotary steering post, of a beveled actuating cam carried by said steering post, a reciprocating shaft actuated by said cam, said shaft having engaging means beveled to correspond with the cam, and means for adjusting one of said beveled surfaces to compensate for wear, substantially as described.

8. The combination with a steering post pivotally mounted to swing angularly on a vehicle, of a steering shaft and wheel rotatably mounted therein, an involute cam carried by the shaft, a shaft mounted to be rocked by said steering post and reciprocated by said cam, a steering wheel, and a connection between said shaft and said steering wheel whereby said wheel is only actuated by the reciprocatory movement of said shaft.

9. In a vehicle, the combination of a steering post, hand wheel and means including a cam and reciprocatory shaft for connecting said hand wheel with the wheels of the vehicle, of a controller, a controller operating shaft within said post and connections including a beveled gear between the said operating shaft and said controller and means including bearings for said reciprocatory shaft for mounting said cam, and said beveled gear to permit said steering post to be angularly adjusted without affecting the operation of said controller or said connections with the vehicle wheel.

10. In a self propelled vehicle, the combination with the wheels of the vehicle and mechanism for controlling the motive power of the vehicle, of a hollow steering post, a rotatable hand wheel mounted thereon, a controller operating shaft rotatably mounted on said post, gear connections between said controlling mechanism and said shaft, a reciprocatory shaft for connecting said hand wheel with the wheels of the vehicle, and means for angularly adjusting said steering post and parts mounted thereon to permit said angular adjustment to be effected without affecting the operative relation between said hand wheel and the wheels and between said controller operating shaft and said controlling mechanism.

In testimony whereof I affix my signature, in presence of two witnesses.

FRANK B. RAE.

Witnesses:
STANTON CLARKE,
FREDERICK E. FLATTERY.